Figure 1:
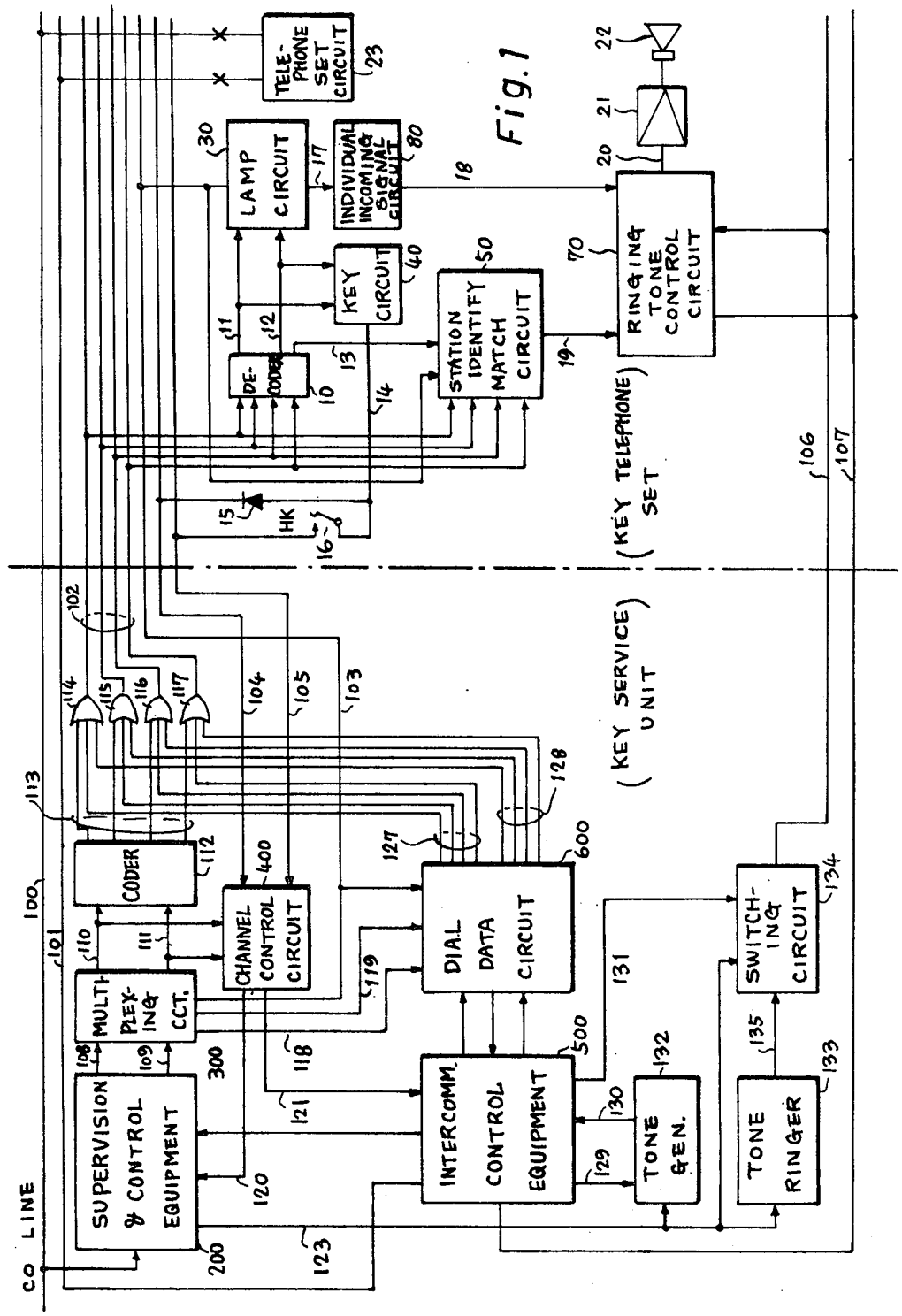

United States Patent [19]

Suzuki et al.

[11] 4,092,501
[45] May 30, 1978

[54] KEY TELEPHONE SYSTEM

[75] Inventors: Akihiko Suzuki, Mitaka; Hikaru Takematsu, Higashikurume, both of Japan

[73] Assignee: Iwasaki Tsushinki Kabushiki Kaisha, Japan

[21] Appl. No.: 756,546

[22] Filed: Jan. 3, 1977

Related U.S. Application Data

[63] Continuation-in-part of Ser. No. 529,046, Dec. 3, 1974, abandoned.

[30] Foreign Application Priority Data

Dec. 5, 1973 Japan .............................. 48-135278
Dec. 5, 1973 Japan .............................. 48-135279
Dec. 5, 1973 Japan .............................. 48-135280
Dec. 14, 1973 Japan .............................. 48-138754

[51] Int. Cl.² .......................................... H04M 1/72
[52] U.S. Cl. ................................................. 179/99
[58] Field of Search ................... 179/99, 15 AL, 18 J

[56] References Cited

U.S. PATENT DOCUMENTS

| | | | |
|---|---|---|---|
| 3,244,815 | 4/1966 | Anderson et al. | 179/99 |
| 3,385,935 | 5/1968 | Anderson et al. | 179/99 |
| 3,519,757 | 7/1970 | Anderson et al. | 179/18 J |
| 3,549,820 | 12/1970 | Knollman | 179/99 |
| 3,843,845 | 10/1974 | Ridley | 179/99 |
| 3,973,085 | 8/1976 | Shiff | 179/99 |

Primary Examiner—Kathleen H. Claffy
Assistant Examiner—Randall P. Myers
Attorney, Agent, or Firm—Robert E. Burns; Emmanuel J. Lobato; Bruce L. Adams

[57] ABSTRACT

A key telephone system, in which at least one CO line, at least one intercomm. line and control lines are arranged between a key service unit and a plurality of key telephone sets. The key service unit is provided with a scanning circuit for generating multiplexed code units indicating the connection state of each channel of said CO line and said intercomm. line in a time-division manner to scan the key telephone sets. The key service unit further includes means for transmitting the code unit to each key telephone set through said control lines. Each of the key telephone sets includes a decoder for decoding the code units thus transmitted to obtain individual indication signals indicating the states of each channel.

3 Claims, 13 Drawing Figures

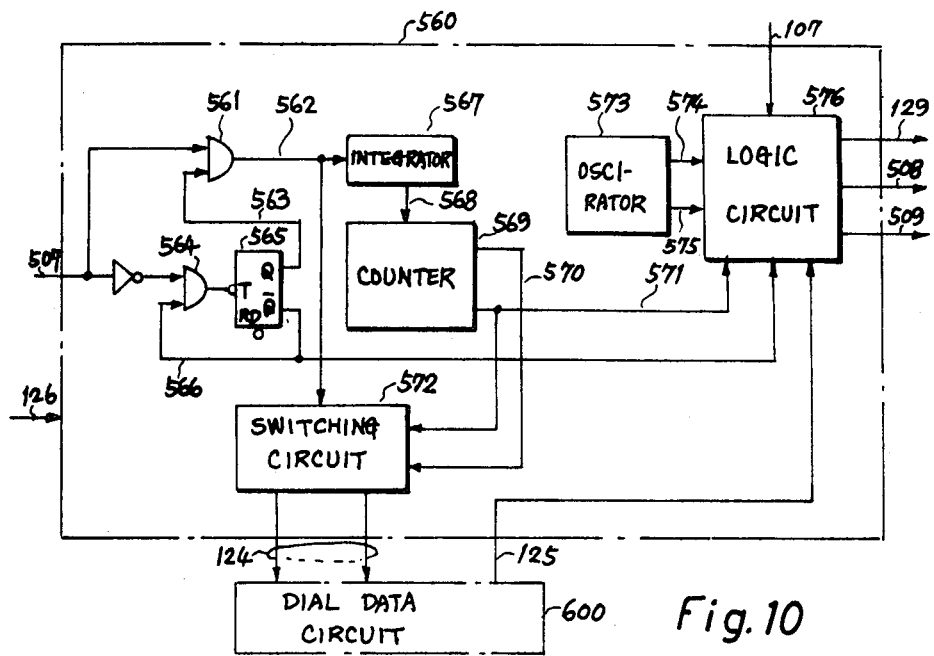
Fig.10
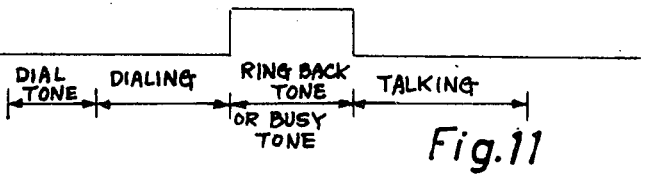
Fig.11

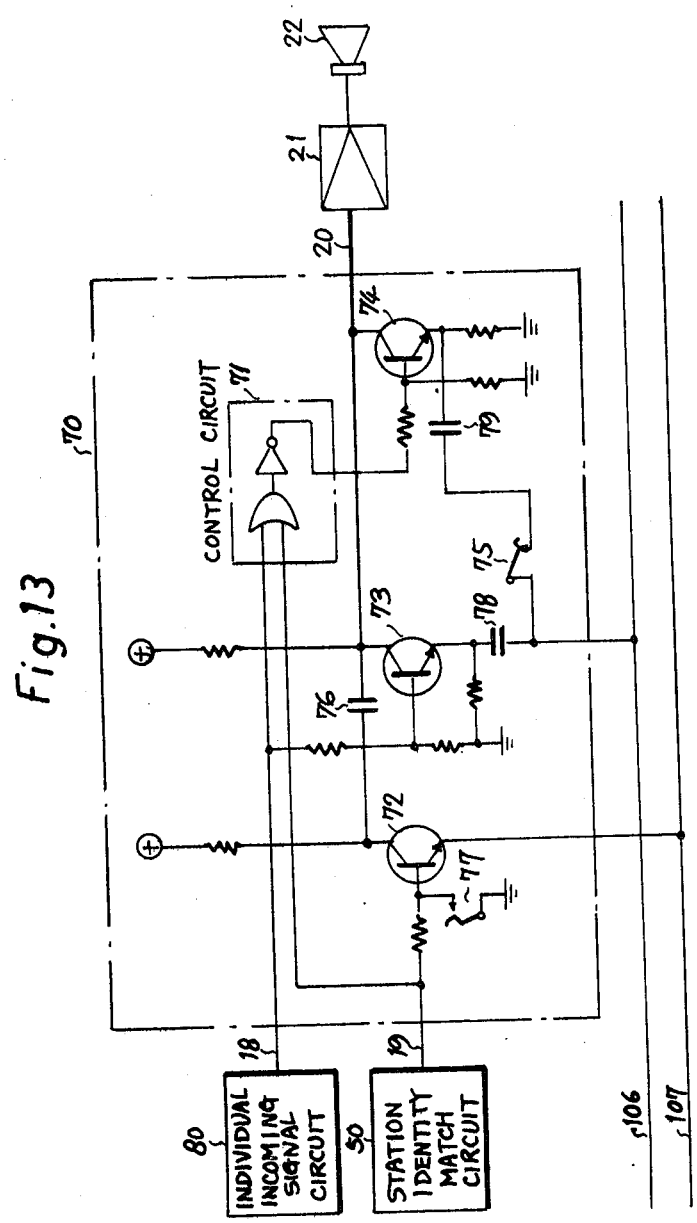

KEY TELEPHONE SYSTEM

This application is a continuation-in-part of our co-pending application, Ser. No. 529,046 filed on Dec. 3, 1974 and now abandoned.

This invention relates to a key telephone system in which telephone lines, extension lines (intercomm line) and control lines are arranged between a key service unit and a plurality of key telephone sets.

In conventional key telephone systems, each telephone channel requires a total of four cable conductor lines such as message channel lines, a lamp line and a control line, and further, an increase in the number of telephone channels causes an increase in the numbers of telephone line circuits and extension line circuits. Therefore, the prior art systems are defective in that special techniques are required for installation of such equipments and in that an increase in the numbers of telephone channels and telephone sets causes a gradual increase in the number of man-hours and in the ratio of wages therefore to the overall cost of construction. Moreover, in the conventional systems, relays are the center of circuit construction, so that the key service unit is inevitably bulky and heavy and a limitation is imposed on its additional functions. Moreover, in many cases, the addition of new additional functions is difficult from the constructional point of view.

An object of this invention is to provide a key telephone system, in which multiplexed code units including channel status discrimination signals and clock pulses are time-divisionally applied to each telephone set to detect its call, its answer and a holding signal simultaneously with successive scanning of each telephone channel, thereby to decrease the number of cable conductor lines used and hence lessen the number of man-hours and wages therefore, thus reducing the overall cost.

With reference to the drawings, this invention will hereinafter be described in detail.

Figure 4:
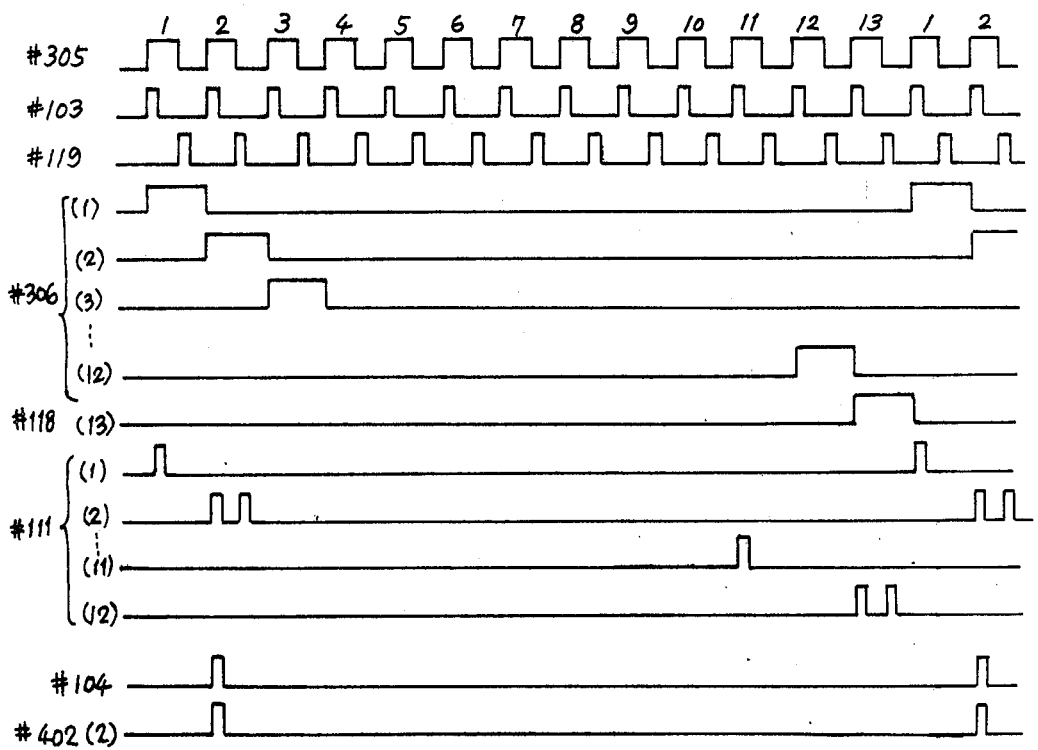
Figure 6:
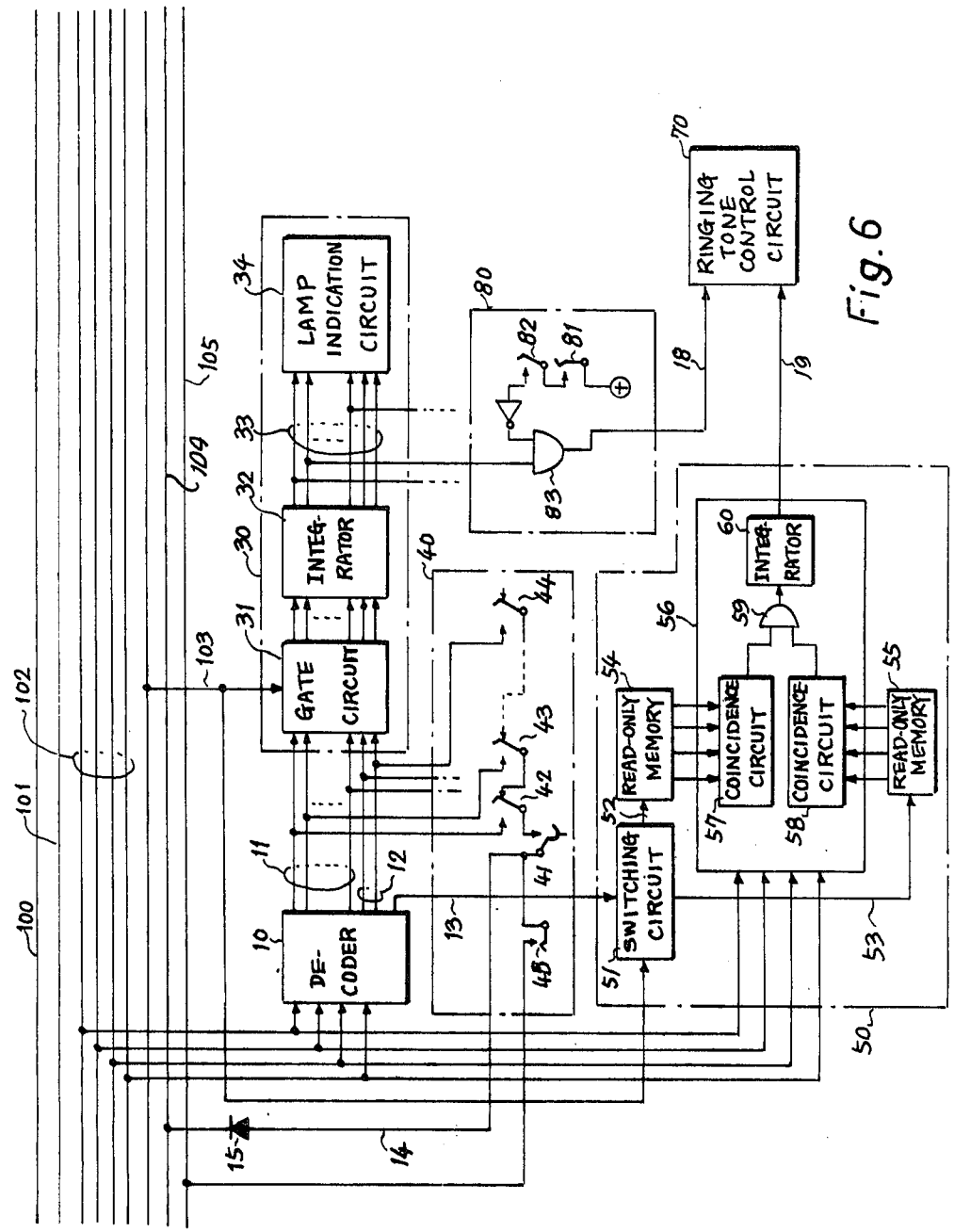

FIG. 1 is a block diagram of an embodiment of this invention, the left half showing a key service unit and the right half a key telephone set;

FIGS. 2, 3, 5, 7 to 10 and 12 respectively show in detail the structures of blocks in the key service unit in FIG. 1;

FIGS. 6 and 13 respectively show in detail the structures of blocks in the key telephone set; and FIGS. 4 and 11 show time charts explanatory of the operation of the illustrated embodiment of this invention.

In FIG. 1, there is shown an embodiment of this invention which employs a branch connection system having ten lines, two intercomm. lines and N key telephone sets, and uses a rotary dial for calling among them.

In FIG. 1, reference numeral 100 indicates CO lines comprising ten communication circuits of branch system; 101 designates an intercomm. (intercommunication) line comprising two communication circuits of branch system; and 102 identifies control lines for transmitting to the key telephone set signals which are time-division multiplexed with a state-of-communication-circuit identifying signal (hereinafter referred to as the identifying signal) including a signal for providing a lamp indication in the key telephone set, clock pulses and an all-communication-circuit scanning signal (hereinafter referred to as the scanning signal), the required number $x$ of conductors being a value satisfying $2^x >$ (the number of all the communication circuits, for instance, four in the case of twelve communication circuits). Reference numeral 103 denotes a clock pulse transmitting line; and 104 and 105 respectively represent an answering line and a holding line, through which, when a communication circuit is established by the key operation of the key telephone set to the calling, answering and holding states, pulse signals transmitted from the key service unit through the control lines 102 during scanning of the communication circuit, are sent back to a channel control circuit 400 of the key service unit described later. Reference numeral 106 shows a line for transmitting a tone-ringer signal produced during a CO line incoming call and an intercomm. general calling tone signal to the key telephone set; and 107 refers to a line for transmitting an intercomm. individual calling tone signal from the key service unit to the key telephone set and an idle/busy signal of the called key telephone set to the key service unit from the telephone set.

Next, the function and operation of each of the block circuits in the key service unit will be described. Reference numeral 200 indicates a supervision and control equipment, which detects a signal incoming from a CO station through the CO line 100 and controls the lamp indication of each communication circuit in the key telephone set in response to a calling, answering or holding signal of the CO line 100 transmitted from a channel control circuit 400 of a calling or answering signal of the intercomm. line transmitted from an intercomm. control equipment 500.

Figure 2:
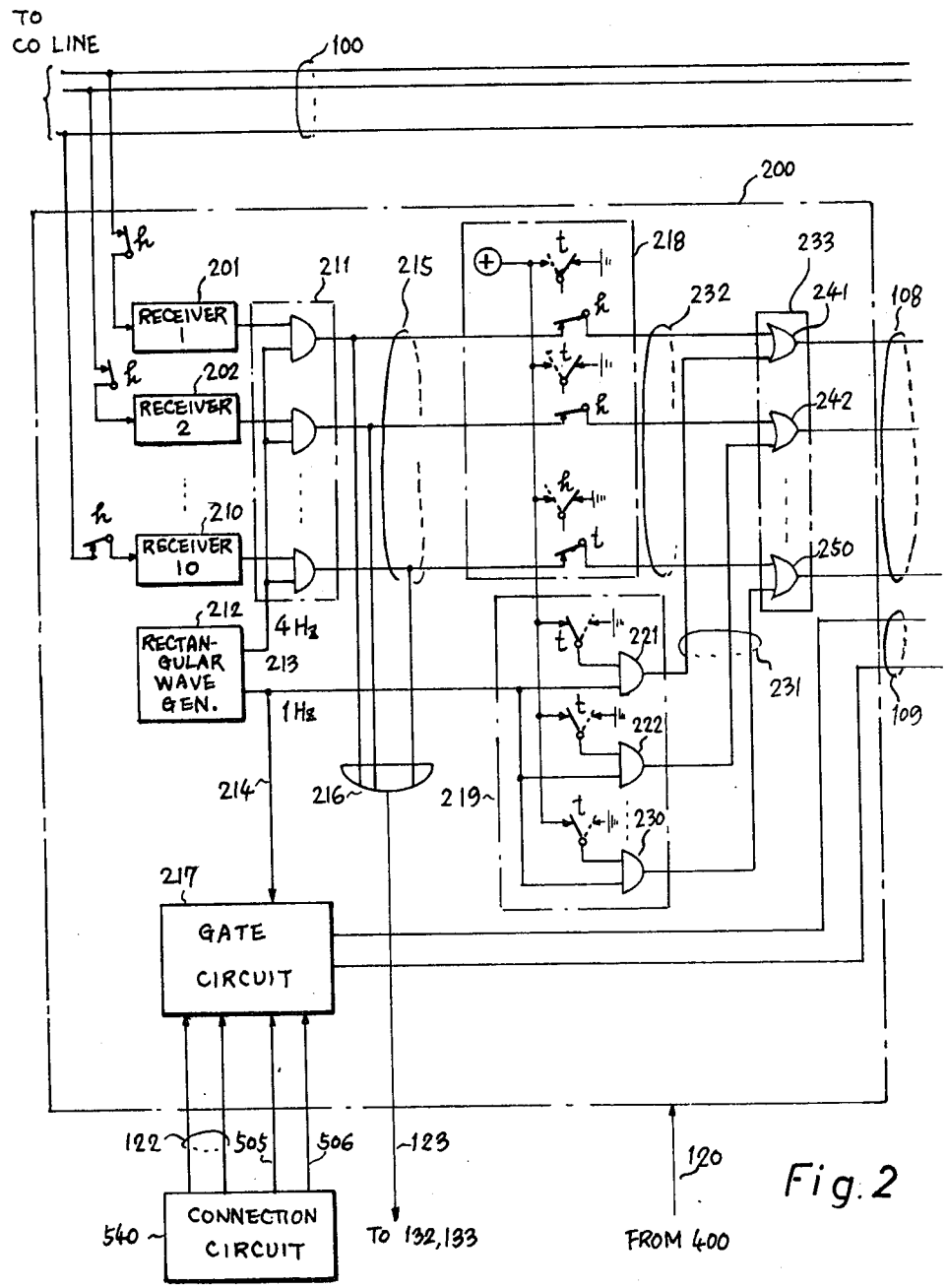

FIG. 2 illustrates in detail the circuit construction of the supervision and control equipment 200. In FIG. 2, reference numerals 201 to 210 indicate CO line receivers, each of which detects a signal incoming through the CO lines 100, converts the detected signal into a DC signal and transmits the DC signal to AND circuits 211. Reference numeral 212 designates a rectangular wave generator, which produces two rectangular waves of 4 Hz for lamp flashing during arrival of an incoming signal and of 1 Hz for lamp flashing during holding and intercomm. calling. Reference numeral 211 identifies the aforesaid AND circuits for flashing the lamp of the channel by the above wave of 4 Hz during arrival of the incoming signal. Reference numeral 216 denotes an OR circuit, which detects the lamp flashing signal appearing on lines 215 during the arrival of the incoming signal to detect the incoming state and transmits the detected state to a tone generator 132 and a tone ringer generator 133 through a line 123. Reference numeral 217 represents a gate circuit which receives an intercomm. calling signal applied from a connection circuit 540 through lines 122, an intercomm. answering signal transmitted from the connectin circuit 540 through lines 505 and 506 and the signal of 1 Hz from the rectangular wave generator 212, by which during the intercomm. calling and answering, the corresponding intercomm. lamps are actuated at 1 Hz and continuously flashed, respectively. The outputs of the gate circuit 217 is transmitted to a multiplexer 300 through lines 109. Reference numerals 218 and 219 show circuits for switching the indication of the channel lamp during the channel answering or holding, which circuits are composed of contacts $t$ and $h$ of relays T and H in the channel control circuit 400. Reference numeral 233 refers to a circuit comprising OR circuits 241, 241 . . . 250, from which channel lamp indication signals during the arrival of incoming, answering and holding are transmitted in response to inputs from the circuits 218 and 219 to a multiplexing circuit 300 through lines 108. An input 120 indicates that the contacts of the relays T and H in the channel control circuit 400 are disposed in the supervision and control equipment 200.

Figure 3:
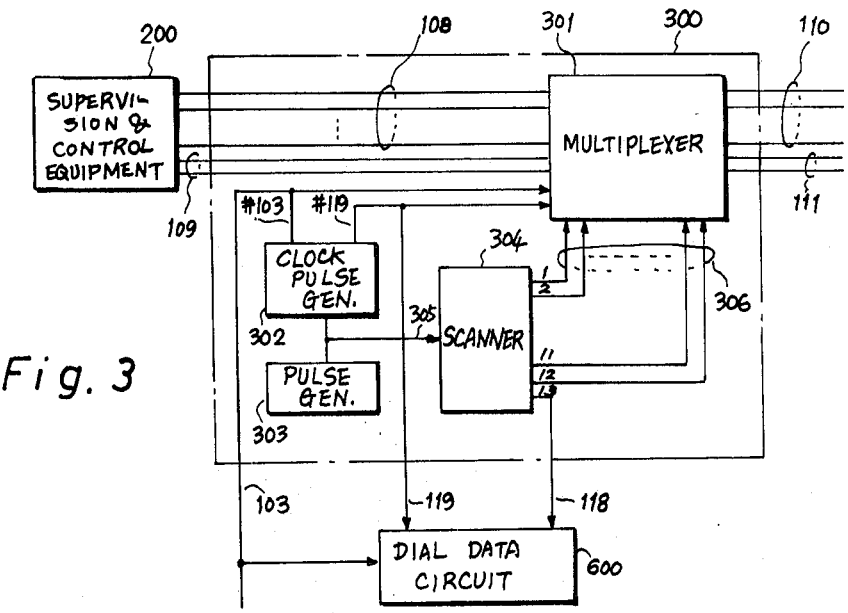

As shown in FIG. 3, the multiplexing circuit 300 is composed of a pulse generator 303, a clock pulse generator 302, a scanner 304 and a multiplexer 301. The pulse generator 303 generates pulses for driving the scanner 304 at a constant period through a line 305; the scanner 304 sequentially scans all the channels; the clock pulse generator 302 provides clock pulses from the pulses generated by the pulse generator 303. The clock pulse No. 103 is not only used for the timing of the time-division multiplexing operation of channel lamp indication signals of the transmission lines 108 and 109 in the multiplexer 301 but also transmitted, as a synchronizing pulse between the key service unit and each key telephone set, to the latter at the usual condition. The multiplexer 301 time-divisionally multiplexes signals of the transmission lines 108, 109, 103, 119 and 306 under the control of the scanner 304 and the clock pulse generator 302.

The last scanning output No. 118 from the scanner 304 and clock pulses No. 119 from the clock pulse generator 302 are both transmitted to a dial data circuit 600.

The time charts of the waveforms No. 305, No. 103, No. 119, No. 306 and No. 118 in lines 305, 103, 119, 306 and 118 are shown in FIG. 4.

With reference to FIG. 1, a coder 112 is a binary coder by which twelve parallel identifying signals transmitted thereto through lines 110 and 111 are converted into 4-bit binary codes. The use of the coder 112 enables a remarked reduction of the number of cable conductors. Reference numerals 114 to 117 indicate OR circuits by which the output code 113 from the coder 112 and the outputs 127 and 128 from a dial data circuit 600 described later are transmitted through the same control lines 102 to each key telephone set in a time sharing manner. In other words, the output code 113 is transmitted to the key telephone set at the timing of the output 306 from the scanner 304 shown in FIG. 3, and the signals 127 and 128 are transmitted to the key telephone set at the timing of the signal No. 118.

The channel control circuit 400 compares an answering signal and a holding signal sent back from the key telephone set through the lines 104 and 105 with signals No. 110 and No. 111 of lines 110 and 111 at the timing of the above answering and holding signals to detect the channel established in the answering or holding state, and drives the relays H and T of the channel to switch the relay contacts in the supervision and control equipment 200, thus providing a lamp indication of the channel as described previously. The channel control circuit 400 also achieves the detection of answering of the intercomm. line in the same manner as the CO lines. The circuit construction of the channel control circuit 400 is shown in detail in FIG. 5.

Figure 5:
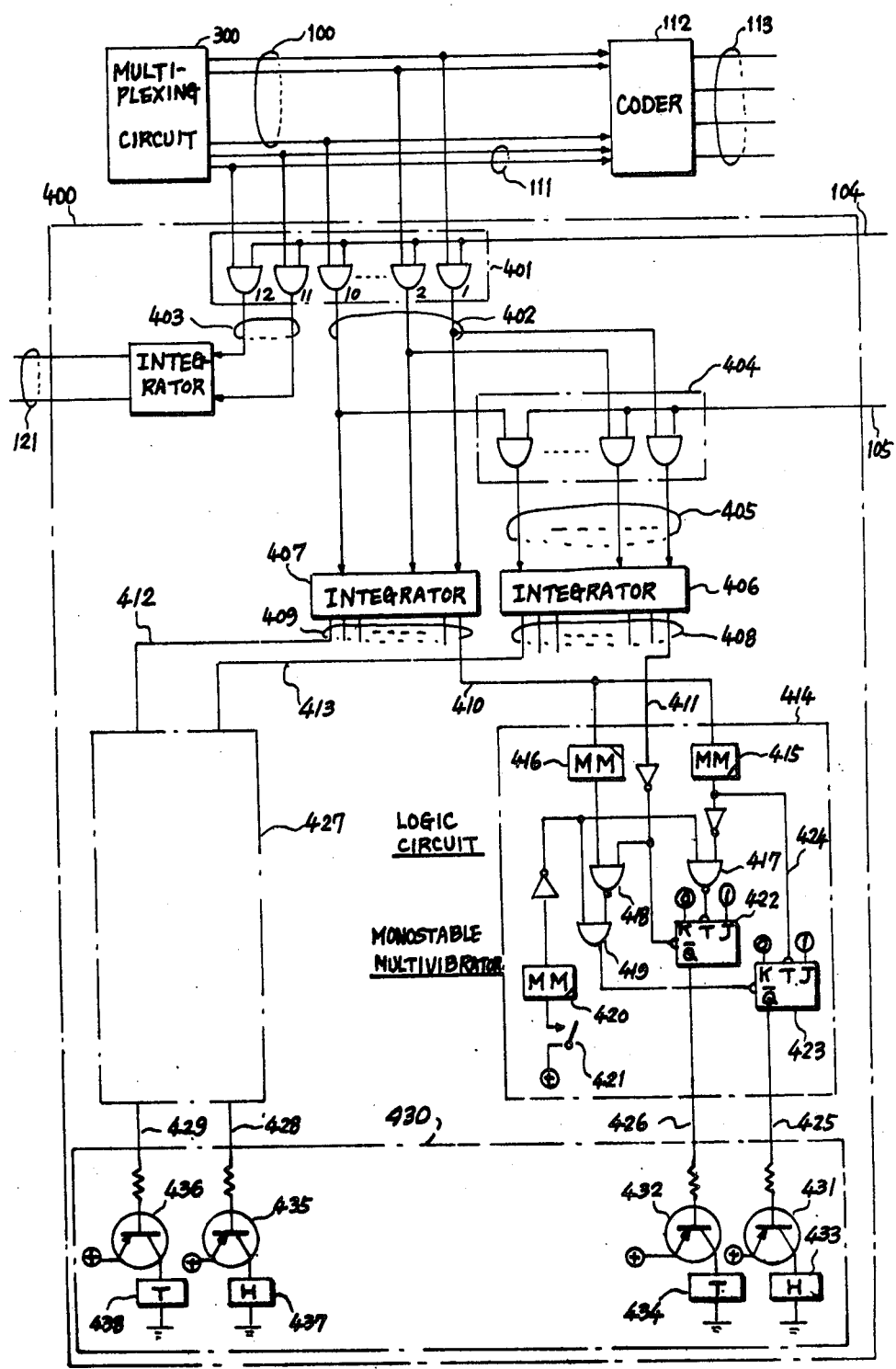

In FIG. 5, reference numeral 401 indicates a coincidence circuit which comprises AND circuits equal in number to the communication circuits (for example, twelve) and detects coincidence of each of input signals No. 110 and No. 111 from the lines 110 and 111 with an input signal No. 104 sent back from the key telephone set through the line 104. As a result of this, if a pulse train of a constant period is generated in any line of the outputs 402 and 403, it is detected that the communication circuit is in the answering state. In FIG. 4, there are shown an example of the waveform of each of the signals No. 110, No. 111 and No. 104 and an example in which a signal No. 402 of a second channel line of the lines 402 is in its answering state.

Reference numeral 404 designates a coincidence circuit which likewise comprises the same number of AND circuits as the channels (for instance, ten) and detects coincidence of each of input signals from the lines 402 with an input signal sent back from the key telephone set through the line 105. As a result of this, if a pulse train of a constant period is produced in any of lines 405 as is the coincidence circuit 401, it is detected that the channel is in its holding state.

Reference numerals 406 and 407 identify integrators which delay the termination of each pulse by more than one pulse interval to convert the pulse train of the constant period into a DC signal.

Reference numerals 414 and 427 denote logic circuits which receive an answering signal and a holding signal from lines 409 and 408, respectively, to drive the relays T and H corresponding to the channels in accordance with the states shown in the following table.

| State | T | H |
| --- | --- | --- |
| Normal | operate | release |
| Answering | operate | operate |
| Holding | release | operate |
| End of Message | operate | release |

Upon turning ON a power supply switch 421, the $\overline{Q}$ output 426 of a flip-flop 422 is reversed by a single pulse of the output of the multivibrator 420 from the state "1" to the state "0". (The relay T is actuated and the H relay is released). Under this condition when an answering signal has entered the monostable multi-vibrator 415 through a line 410, a single pulse is produced at the output of the monostable multivibrator 415, by which the $\overline{Q}$ output of a flip-flop 423 is reversed from the state "1" to the state "0". (The relay H is actuated and the relay T is released.) Next, when a holding signal has been sent back to the channel control circuit 400 through the line 105 as a result of the holding operation of the key telephone set in its answering state, a pulse signal is generated on a line 411, through the coincidence circuit 404 and the integrator 406, to reset the flip-flop 422. (The relay T is released and the relay H is actuated.) Where the key telephone set in its holding state has re-answered, the $\overline{Q}$ output of the flip-flop 422 is reversed again by a single pulse produced at the output of the multivibrator 422. (The relay T is actuated and the relay H is operated.) Upon termination of the answering signal at the end of message, the flip-flop 423 is reset by a single pulse produced at the output of the monostable multivibrator 416. (The relay H is released and the relay T is actuated.), thus returning the channel control circuit 400 to its normal state.

A block 430 comprises relays T and H (433, 434, ... 437, 438) and transistors 431, 432, ... 435 and 436 for actuating them. The relays T and H are actuated by the control signals from the Q outputs 425 and 426 of the flip-flops 423 and 422 to perform the operations shown in the above table. The contacts of the relays T and H are shown in the supervision and control equipment 200.

The above is the channel control system and the communication circuit state indicating system of the key service unit in the key telephone system.

Next, a description will be given of a control system in the key telephone set corresponding to the key service unit.

In FIG. 1, reference numeral 10 indicates a decoder by which the identifying signals of the lines 102, binary-coded by the coder 112 of the key service unit, are converted again into decimal codes corresponding in number to the channels; 11 designates a line corresponding to one of the ten channels; and 12 identifies a line corresponding to one of the two intercomm. lines. Reference numeral 13 denotes a pulse of the same timing as the last scanning output 118 from the scanner 304 of the key service unit. The pulse 13 is transmitted to a station identify match circuit 50 and used as a timing pulse during intercomm. individual calling described later. A key circuit 40 comprises ten lock type channel buttons 42, 43 . . . , two lock type intercomm. buttons 44 . . . , a non-lock type holding button (also serving as an intercomm. general calling button) 45 and a hook switch 41, as shown in FIG. 6. The buttons 42 to 45 are interlocked so that while any one of the channel buttons is depressed, if the holding button 45 is depressed and released, the channel button is released. In the key circuit 40, when any one of the channel buttons 42, 43 is pushed to call or answer, one of the clock pulses No. 103, appearing in the line 11 in a very short time during which the channel having called or answered is scanned, is transmitted to the key service unit through the channel button 41, a line 14, a diode 15 and the line 104, actuating the relay H corresponding to the channel. Further, if the holding operation is achieved by pushing the holding button 45 while any one of the channels is busy, one of the clock pulses No. 103 is transmitted to the channel control circuit 400 through the line 105 in the same manner as described above, releasing the relay T corresponding to the channel to establish the channel in the holding state.

Reference numeral 30 identifies a lamp circuit which removes timing pulses of the clock pulses No. 103 from the identifying signal transmitted through the lines 11 and 12 in the time-sharing manner to identify only a communication circuit lamp indicating signal to provide the lamp indication for each communication circuit. As shown in FIG. 6, the lamp circuit 30 comprises a gate circuit 31, an integrator 32 and a lamp indication circuit 34.

The gate circuit 31 compares input signals from the lines 11 and 12 and the clock pulses No. 103 from the line 103 in timing with each other to obtain only a lamp indication signal corresponding to the timing of the pulses No. 119 as illustrated in FIG. 4. The integrator 32 converts the pulse signal of constant period, derived from the gate circuit 31, into a DC signal on one of lines 33. The lamp indication circuit 34 detects the DC signal on one of the lines 33 as a lamp indication signal to drive one of indication lamps such as luminescent diodes or neon lamps.

Reference numeral 80 designates an individual incoming signal gate. Usually, one of the lines 33 is connected to the individual incoming signal gate 80 as shown in FIG. 6 to correspond to a pre-selected one of the CO lines. Only when an incoming signal has arrived at the preselected line and a channel lamp indication signal of 4 Hz has appeared, a coincidence signal is transmitted to a ringing tone control circuit 70 through a line 18 to provide the audible indication by a tone ringer signal by way of example. In the individual incoming signal gate 80, reference numeral 83 identifies a gate for stopping the abovesaid audible indication by the operation of a hook switch 81 and a channel button 82 in the case of having answered the preselected CO line.

Reference numeral 23 denotes a telephone set circuit, which is connected to the lines 100 and 101 through keys and a hook switch.

The above is the channel state indication system in the key telephone system according to this invention. As is evident from the above, in the present invention, the channel lamp indication signal is discriminated by the clock pulses from the multiplexed identifying signal in the key telephone set to provide the lamp indication. This enables a remarked reduction in the number of cable conductors necessary for the channel lamp indication, and permits easy and inexpensive provision of the individual incoming signal receiving function by using the same lamp indicating line, thus achieving the aforesaid objects.

Next, a description will be given with respect to an intercomm. control system relating to the control and transmission of various calling tones such as an intercomm. individual calling tone for calling a desired one of the key telephone sets by a dialling operation, a general calling tone for simultaneously calling all of the other key telephone sets by another dialling operation, and so on.

Figure 7:
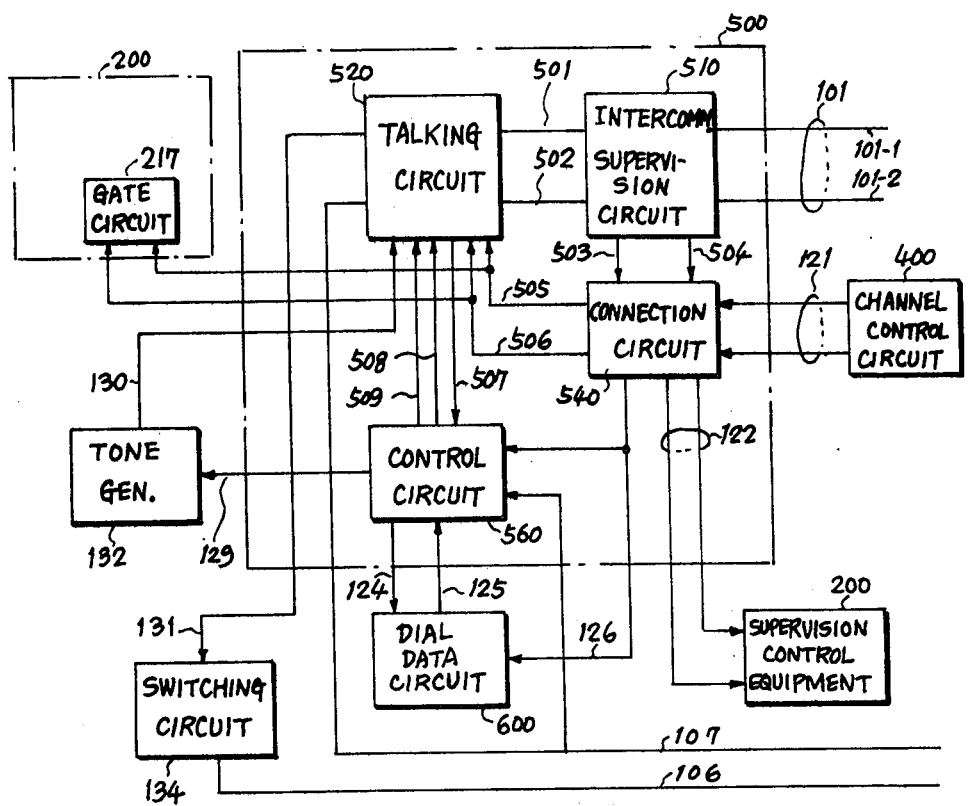

In FIG. 1, the intercomm. control equipment 500 is provided to perform all controls for intercomm. individual and general calling by a dial operation using a rotary dial. The circuit construction of the intercomm. control equipment 500 in the case of two intercomm. lines is illustrated in FIG. 7 in a block form. In FIG. 7, reference numeral 510 designates an intercomm. supervision circuit for detecting an intercomm. call in the key telephone set, for transmitting dial pulses during an individual calling operation to the key service unit and for transmitting audible indication signals such as a dial tone, a ring back tone, a busy signal, etc. to a calling key telephone set. Reference numeral 520 identifies a talking circuit which comprises various analog switches and a dial pulse converting and shaping circuit necessary for the individual calling and the general calling by various control signals from a connection circuit 540 and a control circuit 560.

Figure 8:
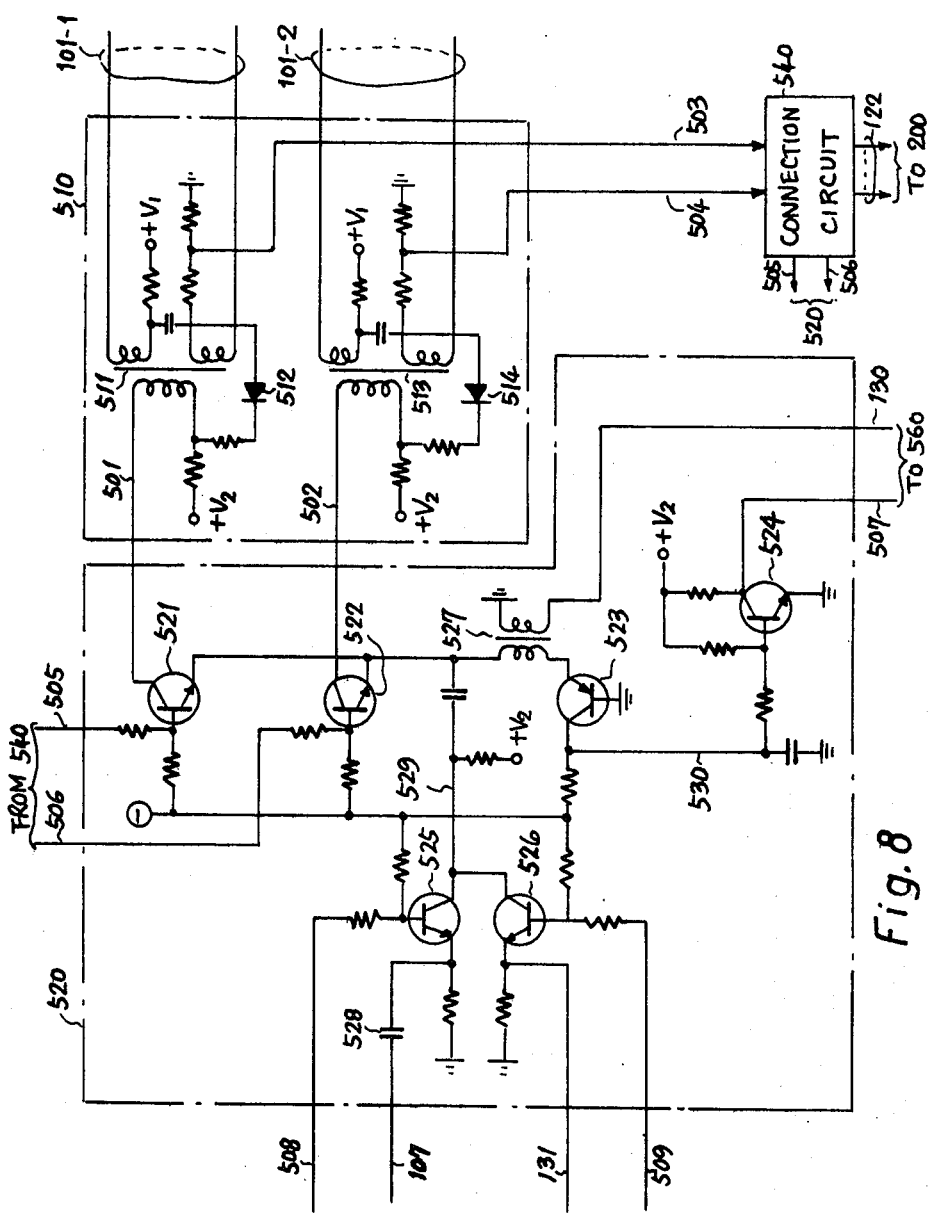

An example of each of the intercomm. supervision circuit 510 and the talking circuit 520 are illustrated in detail in FIG. 8. In FIG. 8, the intercomm. line 101 accommodates two communication circuits. Reference numerals 511 and 513 designate transformers for an intercomm. current supply and the AC signal transmission, respectively; and 512 and 514 identify diodes for the dial pulse transmission. If now a current flows by an intercomm. call to the key telephone set, a DC voltage on a line 503 drops due to a voltage drop by a resistor. Accordingly, by transmitting the signal to the connection circuit 540, the intercomm. call can be detected. Reference numerals 521 and 522 denote transistors for switching the dial pulses, the dial tone signal, the ring back tone signal and the busy signal by control signals 505 and 506 in the case of an individual call. Reference numeral 527 represents a transformer for supplying the dial tone signal, the ring back tone signal and the busy signal from the tone generator 132 to the lines 101 through the intercomm. supervision circuit 510. Reference numerals 523 and 524 show transistors for modifying, make and break of the dial pulse transmitted through the line 101 from the key telephone set and for shaping the dial pulses to send out to the control circuit 560. Reference numerals 525 and 526 refer to transistors which serve as analog switches for transmitting respective ringing signals in response to the control signals 508 and 509 in the cases of individual calling and general calling to each key telephone set through the lines 107 and 131.

With reference to FIG. 7, the connection circuit 540 detects intercomm. calling and answering to transmit an intercomm. lamp indication signal to the supervision and control equipment 200, transmits a control signal of calling to the talking circuit 520 or produces a reset pulse at the time of the called key telephone set answering to reset memories in the control circuit 560 and the dial data circit 600. An example of the circuit construction of the connection circuit 540 is shown in detail in FIG. 9.

Figure 9:
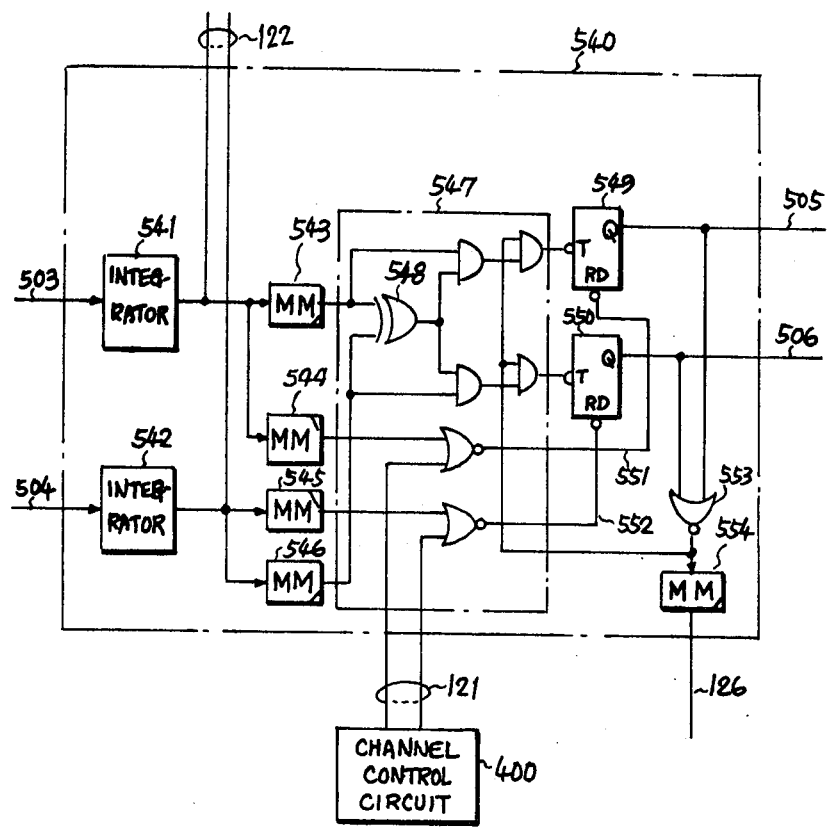

In FIG. 9, reference numerals 541 and 542 indicate integrators for removing the dial pulses; 543, 546 and 544, 545 designate monostable multivibrators each of which changes the state in the rise and fall times of an input signal; and 547 identifies a logic circuit comprising a non-coincidence circuit 548 and so on, which circuit serves as a lockout circuit in the case of seizing one dial memory with two intercomm. channels. Reference numerals 549 and 550 denote flip-flops, which act as memories for storing the state from the time of intercomm. calling to the time of answering by the called key telephone set; and 553 and 554 represent a circuit for generating a single pulse at the answering time of the called key telephone set. When a calling signal has arrived through the line 503, it is transmitted to the supervision and control equipment 200 through the integrator 541 and the line 122, and at the same time, the monostable multivibrator 543 operates to reverse the Q output of the flip-flop 549 from the state "0" to the state "1", and this signal is transmitted to the supervision and control equipment 200 and the talking circuit 520. As a result of this, the corresponding intercomm. lamp is turned ON and OFF at a frequency of 1 Hz, and the talking circuit 520 sends out a dial tone signal to the calling key telephone set. After the dial operation, when the called key telephone set has answered, an answering signal appears on a line 551 from the channel control circuit 400 through the line 121 to reset the flip-flop 549, reversing again the signal 505 from the state "1" to the state "0". As a consequence, the intercomm. lamp changes from its ON-OFF state to the stably flashing state and, at the same time, the monostable multivibrator 554 changes the state to transmit a reset signal to the control circuit 560 and the dial data circuit 600 through a line 126.

The monostable multivibrators 544 and 545 are provided for resetting the flip-flops 549 and 550 at the time of abandoning a call.

The control circuit 560 is a circuit which, in the case of making an intercomm. individual call by a tone or by a sound and a general call by dialling, analyzes the received hook signal and dial pulses for transmission of a ringing signal of tone or sound to each key telephone set or a signal tone such as a dial tone, a ring back tone and a busy tone to the calling key telephone set. The control circuit 560 comprises a counter 569 composed of a binary counter and a ternary counter, a dial memory switching circuit 572, an oscillator 573 and a logic circuit 576.

FIG. 10 shows in detail an example of the circuit construction of the control circuit 560 and FIG. 11 shows time charts of waveforms at its respective parts in accordance with the sequence of operation.

The hook signal and the dial pulse transmitted from the talking circuit 520 through the line 507, shown as a signal No. 507 in FIG. 11, are applied to a gate 561 and a flip-flop 565 to produce a signal No. 562 of only dial pulses on the line 562 and a signal No. 566 for controlling the dial tone on a line 566. The signal No. 562 on the line 562 is transmitted to the dial memory switching circuit 572, and at the same time, integrated by an integrator 567 to provide pulses No. 568 which are transmitted to the counter 569 through a line 568. The counter 569 is a counter for detecting the instant of completion of dialling of each digit in the case of an intercomm. call of 2-digit dial pulses as shown in FIG. 11, and this counter 569 transmits signals No. 570 and No. 571 on lines 570 and 571 to the dial memory switching circuit 572 and the logic circuit 576. The dial memory switching circuit 572 divides the abovesaid 2-digit dial pulses No. 562 transmitted through the line 562 into dial pulses of each digit under the control of the signals No. 570 and No. 571 and transmit them to the dial data circuit 600 through lines 124.

The ocsillator 573 is provided for generating intermittent signals of 1 Hz and 2 Hz necessary for the individual ringing signal and the busy signal of tone. The logic circuit 576 transmits to the talking circuit 520 through the lines 508 and 509, and the tone generator 132, through the line 129, control signals necessary for generating various ringing signals and various signal tones such as the dial tone and the busy signal tone under the control of the idle/busy signal 107 of the called key telephone set, a special dial signal from the line 125 and signals No. 574, No. 575, No. 566 and No. 571 on the lines 574, 575, 566 and 571. The logic circuit 576 is composed of IC gates and so on. The above is the intercomm. control equipment 500.

Figure 12:
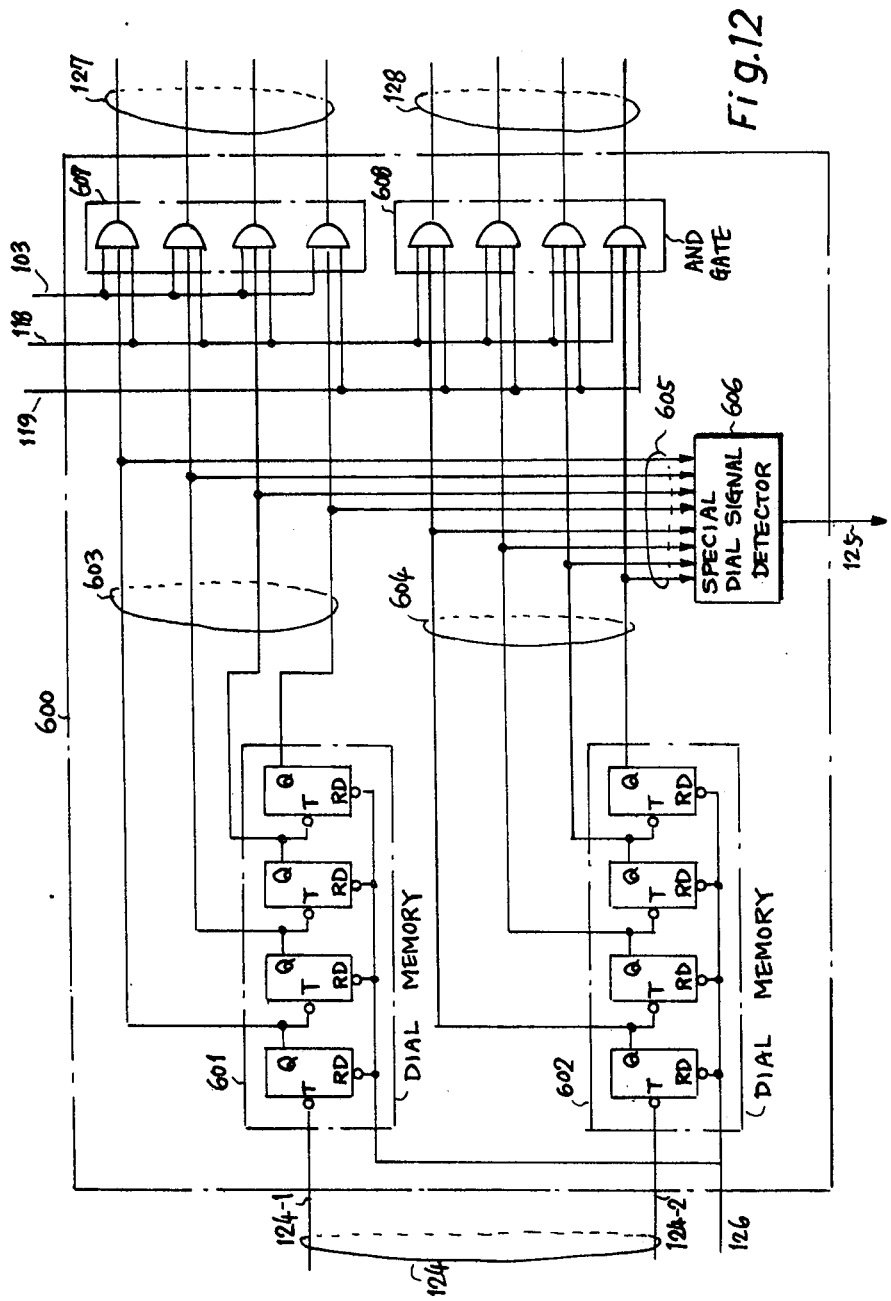

With reference to FIGS. 1, 10 and 12, the dial data circuit 600 counts and stores dial pulses transmitted thereto from the dial memory switching circuit 572 through the lines 124, and then transmits the dial data in a time-sharing manner to each key telephone set with the timing pulses on the lines 103, 118 and 119, and detects the special dial pulses such as the general calling and transmit them to the control circuit 560. This dial data circuit 600 comprises dial memories 601 and 602, AND gates 607 and 608 and a special dial signal detector 606.

The dial pulses transmitted from the dial memory switching circuit 572 through the line 124 are counted by the dial memory 601 for the second digit and the dial memory 602 for the first digit, and then stored. That is, the dial pulses of the respective digits are coded into binary numbers of four bits, and respectively applied as dial data to the inputs of the AND gates 607 and 608 through the lines 603 and 604. Then, the dial data of the respective digit is time-divided in the scanning time of the last output 118 of the scanner 304, which is not used for the channel scanning, and at the timings of the clock pulses No. 103 and No. 119 in FIG. 4, and multiplexed with the identifying signal in the OR circuits 114 to 117, thereafter being transmitted to the respective key telephone sets.

The special dial signal detector 606 is provided for detecting a special dial signal in the case of achieving the general call or like special function by dialling, and transmitting the special dial signal to the logic circuit 576.

As is evident from the foregoing description, by time-divisionally multiplexing the channel scanning signal, the identifying signal and the intercomm. individual calling signal in the key service unit, these signals can be transmitted to the key telephone sets through the same line, and the object of this invention is thus accomplished. Further, the present invention has a merit that, by increasing the number of bits in the scanner, the capacity of the dial data circuit can be increased at low cost without increasing the number of cable conductors.

In the tone generator 132, the dial tone, the ring back tone, the ringing signal and the busy signal are generated by the control signal transmitted from the intercomm. control equipment 500 through a line 129, and these outputs are transmitted to the intercomm. control equipment 500 through a line 130. The tone generator 132 comprises an oscillator and various switches. An incoming signal applied through the line 123 is used as a control signal for producing the busy signal in the case of the incoming signal being received during the general calling.

The tone ringer 133 generates a tone ringer signal for the audible indication based on the incoming signal from the line 123.

In FIG. 1, reference numeral 134 indicates a switching circuit. Since the tone ringer signal and the intercomm. general calling signal are transmitted to the key telephone set through the same line 106, if an incoming signal arrives during the intercomm. general calling, the general calling is interrupted under control of the supervision and control equipment 200, and the tone ringer signal is preferentially transmitted to the key telephone set. In this case, the busy signal is applied by the control of the intercomm. control equipment 500 to the key telephone set which is making the general calling.

The above is the control system in the key service unit in the cases of the intercomm. individual calling and general calling by the dial operation.

Next, a description will be made in connection with the control system in the key telephone set corresponding to the control system in the key service unit described above.

In FIG. 1, the station identify match circuit 50 is provided to detect the called key telephone set in the case of the intercomm. individual calling by dialling. The circuit construction of this circuit is illustrated in detail in FIG. 6.

In FIG. 6, reference numerals 54 and 55 indicate read-only memories, in which 4-bit binary codes corresponding to the numerals of respective digits of the telephone number are preset for each key telephone set. For instance, in a case where the number of the called telephone set is "32" as in the example of FIG. 11, the 4-bit outputs from the read-only memories 54 and 55 are set in the form of binary codes of "3" and "2". Reference numerals 57 and 58 designate coincidence circuits for the second and first digits, respectively. Each of the coincidence circuits 57 and 58 compares each dial numeral of each digit transmitted through the lines 102 with the binary code preset in the coincidence circuit 57 or 58, and in the case of coincidence, applies a coincidence signal to the input of an AND gate 59. Accordingly, only when the numerals of the two digits are both coincident with the abovesaid binary codes, the coincidence signal is applied to a ringing tone control circuit 70 through the AND gate 59 and an integrator 60. Reference numeral 51 identifies a switching circuit, by which the dial data transmitted in the time-sharing manner through the lines 102 is switched by the control of the signals on the lines 103 and 13 to the read-only memories 54 and 55 for synchronization with the coincidence circuits 57 and 58. The ringing tone control circuit 70 is provided with a control circuit for controlling the switching of the intercomm. individual calling tone signal and the general calling tone signal by a tone or a sound and the determination of priority of one of the calling tone signals over the other. An example of the circuit construction of the ringing signal control circuit 70 is shown in detail in FIG. 13.

In FIG. 13, reference numeral 72 indicates a transistor which operates at the time of the intercomm. individual calling. In a case where the called key telephone set is selected by the station identify match circuit 50 after the intercomm. individual calling operation, a coincidence signal is applied through a line 19 to the base of the transistor 72, and only when a hook switch 77 is in its break state and the called key telephone set is idle, the transistor 72 is turned ON. At this time, a DC idle signal is transmitted from the emitter of the transistor 72 to the control circuit 560 in the key service unit through the line 107. Conversely, in a case where the called key telephone set is busy, the transistor 72 is not turned ON, and the abovesaid DC signal is not applied to the key service unit, so that the control circuit 560 detects that the called key telephone set is busy. As described above, only when the called key telephone set is idle, the intercomm. individual calling tone signal transmitted from the key service unit through the line 107 is applied to a speaker 22 through the transistor 72, a capacitor 76 and an amplifier 21.

Reference numeral 73 designates a transistor which operates at the time of arrival of an individual incoming signal. When a coincidence signal for individual incoming signal has been detected by an individual incoming signal gate 80, the coincidence signal is applied to the base of the transistor 73 through a line 18 to turn ON the transistor 73. Consequently, the tone ringer signal transmitted through the line 106 can be applied to the speaker 22 through a capacitor 78, the transistor 73, a line 20 and the amplifier 21.

Reference numeral 74 identifies a transistor for intercomm. general calling. A voice signal from a transmitter of a calling telephone set while depressing a push button 75 is transmitted from the key service unit to all of the other key telephone sets through the line 106, and radiated as a voice from the speaker 22 through the push button 75, a capacitor 79, the transistor 74 and the amplifier 21.

By the way, a control circuit 71 is a logic circuit for appropriately controlling the switching transistors 72, 73 and 74, and priority of the calling mode of each of the individual incoming, intercomm. individual calling and intercomm. general calling can freely be determined by wiring or unit alterations. For example, it is possible to give priority to both or either one of the individual CO line incoming calling and the intercomm. individual calling over the general calling. However, in a case where an incoming signal has arrived during a general calling, the general calling is interrupted by the switching circuit 134 in the key service unit and only the tone ringer signal is transmitted to each key telephone set, as described previously with regard to FIG. 1. Therefore, the abovesaid function is lost.

As is apparent from the foregoing, in cases where various calling tones are radiated from the speaker of the key telephone set in the key telephone apparatus, use is made of two calling tone signal lines: one for the transmission of the tone ringer signal and the intercomm. general calling tone signal and the other for the transmission of the intercomm. individual calling tone signal and the idle or busy signal of the called key telephone set, regardless of the numbers of communication circuits and key telephone sets used. In the key service unit, either the tone ringer signal or the intercomm. general calling tone signal is switched by the switching circuit 134, and transmitted to each key telephone set. In the key telephone set, the calling tone signal transmitted from the key service unit can be freely given priority by the control of the station identify match circuit 50, the individual incoming signal gate 80 and the ringing tone control circuit 70, and sent out from the speaker 22 of the key telephone set without degradation of the calling quality, accomplishing the object of the present invention.

As has been described in the foregoing, this invention enables all of the calls with two conductors regardless of the numbers of communication circuits and key telephone sets, and has merits of the reduction of the number of conductors and enhancement of the calling function.

Further, the present invention can also be realized with one conductor by switching all the calling tone signals in the key service unit.

What we claim is:

1. In a key telephone system including at least one CO trunk line, at least one intercomm. line, and control lines connected between a key service unit and a plurality of key telephone sets each having a read-only memory for storing the telephone number of the respective key telephone set, the improvement which comprises: said key service unit including scanning means for generating code unit signals indicating the connection state of each channel of said CO line and said intercomm. line in a time-division mode, and including means for transmitting code unit signals and clock pulses indicating the timing thereof as a multiplexed signal to each key telephone set through the control lines; and each of said key telephone sets including a decoder for decoding the code unit signals from the multiplexed signal to obtain individual indication signals indicating the states of each channel, and said key service unit including means for transmitting to each telephone set a control signal for separating the clock pulses from the code unit signals in the multiplexed signal; said decoder comprising means for detecting said clock pulses under control of said control signal, and means for applying to said key service unit a signal obtained from said clock pulses detected and indicating calling or answering of each channel, thereby to control said scanning means, wherein after an operation of individual intercomm. calling or intercomm. group calling from each key telephone set, a dial signal is transmitted digit by digit in a time-division manner to each called key telephone set through the same line as the multiplexed signal by utilizing at least one bit of the output of the scanning means of the key service unit not used for channel scanning and said clock pulses to select at least one called telephone set, and wherein the contents of the read-only memory in each called telephone set for storing the telephone number of the telephone set is read out by the output of said decoder and the clock pulses to be compared with the dial signal from the key service unit in synchronism with each other, thereby to select the called telephone.

2. A key telephone system according to claim 1, in which each of said key telephone sets further includes a gate circuit for comparing the decoded signal with clock pulses indicating the timing of the code unit signals to obtain individual indicating signals, thereby to provide indication signals for the visible indication of each channel calling, answering, talking and holding, and means for performing an audible indication function in resonse to the indication signals and a ringing tone supplied from the key service unit.

3. A key telephone system according to claim 1, in which the key service unit includes a switching circuit for switching a CO line ringing tone and an intercomm. general calling tone; each of the key telephone sets including a switch for the CO line ringing tone, the intercomm. intercalling tone and the intercomm. general calling tone, and an audible ringing tone control circuit for controlling preference of these calls; said control lines comprising two lines, one of which is used for transmitting the CO line ringing tone and the intercomm. general calling tone, the other of which is used for the individual intercomm. calling tone, and idle signal and a busy signal of the called telephone set, whereby preference of the modes of calls can be determined and changed as desired for each telephone set irrespective of the numbers of channels and telephone sets used.

* * * * *